United States Patent
Hattori et al.

(10) Patent No.: US 10,138,969 B2
(45) Date of Patent: Nov. 27, 2018

(54) FRICTION MATERIAL

(71) Applicant: Nisshinbo Brake, Inc., Tokyo (JP)

(72) Inventors: Yasuki Hattori, Gunma-ken (JP); Mitsuaki Yaguchi, Gunma-ken (JP); Toshiya Takada, Gunma-ken (JP)

(73) Assignee: Nisshinbo Brake, Inc., Tokyo (JP)

( * ) Notice: Subject to any disclaimer, the term of this patent is extended or adjusted under 35 U.S.C. 154(b) by 0 days.

(21) Appl. No.: 14/778,049

(22) PCT Filed: Mar. 22, 2013

(86) PCT No.: PCT/JP2013/058255
§ 371 (c)(1),
(2) Date: Sep. 17, 2015

(87) PCT Pub. No.: WO2014/147807
PCT Pub. Date: Sep. 25, 2014

(65) Prior Publication Data
US 2016/0069408 A1    Mar. 10, 2016

(51) Int. Cl.
*F16D 69/02*    (2006.01)

(52) U.S. Cl.
CPC ...... *F16D 69/026* (2013.01); *F16D 2200/006* (2013.01); *F16D 2200/0052* (2013.01); *F16D 2200/0056* (2013.01); *F16D 2200/0069* (2013.01); *F16D 2200/0073* (2013.01); *F16D 2200/0086* (2013.01); *F16D 2250/0046* (2013.01)

(58) Field of Classification Search
CPC ............. F16D 69/026; F16D 2200/006; F16D 2200/0056; F16D 2200/0052; F16D 2200/0086; F16D 2200/0073; F16D 2200/0069; F16D 2250/0046
See application file for complete search history.

(56) References Cited

U.S. PATENT DOCUMENTS

| | | | | |
|---|---|---|---|---|
| 5,127,949 A | * | 7/1992 | Nakazawa | F16D 69/025 106/36 |
| 5,824,923 A | * | 10/1998 | Kondoh | B22F 1/0003 419/11 |
| 2002/0033315 A1 | * | 3/2002 | Yamane | B29C 43/006 192/107 M |
| 2006/0228629 A1 | * | 10/2006 | Christian | H01M 4/485 429/231.1 |
| 2013/0228403 A1 | * | 9/2013 | Kikudome | F16D 69/026 188/251 A |

FOREIGN PATENT DOCUMENTS

| | | | |
|---|---|---|---|
| JP | 1979-138879 | 10/1979 | |
| JP | 1987-237127 | 10/1987 | |
| JP | 1998-245441 | 9/1998 | |
| JP | 2005-097374 A | 4/2005 | |
| JP | 5057000 | 5/2012 | |
| JP | WO2012/066968 A1 | 5/2012 | |
| JP | 2012-107084 | 6/2012 | |
| JP | 5057000 B | 10/2012 | |
| JP | 2012-250155 A | 12/2012 | |
| WO | WO2012020099 A | 2/2012 | |
| WO | WO 2012066966 | * 5/2012 | ............... C09K 3/14 |

OTHER PUBLICATIONS

Trammell et al, Analysis of Natural Graphite, Synthetic Graphite, and Thermosetting Resin Candidates for Use in Fuel Compact Matrix, OkaRidge National Laboratory, pp. 1-66, Jan. 5, 2010.*
Gilardi et al, Copper Substitution and Noise Reduction in Brake Pads: Graphite Type Selection, Materials, vol. 5, pp. 2258-2269, Nov. 9, 2012.*
Definition of "sheet", Dictionary.com pp. 1-7, Mar. 1, 2018.*
Expandable Graphite, Asbury Carbons, Asbury N.J., pp. 1-6.*
Raffaele Gilardi et ai, "Copper Substitution and Noise Reduction in Brake Pads: Graphite Type Selection", Materials 2012, 5, 2258-2269.
'Carbon Powder-Based Solutions for Friction Materials—Product Portfolid', TIMCAL Graphite & Carbon, published in 2012.
"Carbon Additives for Polymer Compounds", TIMCAL Graphite & Carbon, published in 2012.

* cited by examiner

*Primary Examiner* — Alexander C Kollias
(74) *Attorney, Agent, or Firm* — Tracy M Heims; Apex Juris, pllc

(57) ABSTRACT

The present invention addresses the problem of providing a disc brake pad friction material, which is capable of securing fade resistance and wear resistance while satisfying laws relating to copper component content and for which coating by electrostatic powder coating is favorable. As a means for solving the problem, a friction agent composition, which contains 0.3-5 weight % of flake graphite particles of 1-100 μm mean particle diameter with respect to the total amount of the friction material composition as a lubricant and in which the total amount of copper components contained in the friction material composition is less than 5 weight % of the total amount of the friction material composition, is used. Preferably, the flake graphite particles are aggregates. It is also preferable that the friction material composition contains mica with a mean particle diameter of 100-400 μm.

4 Claims, 1 Drawing Sheet

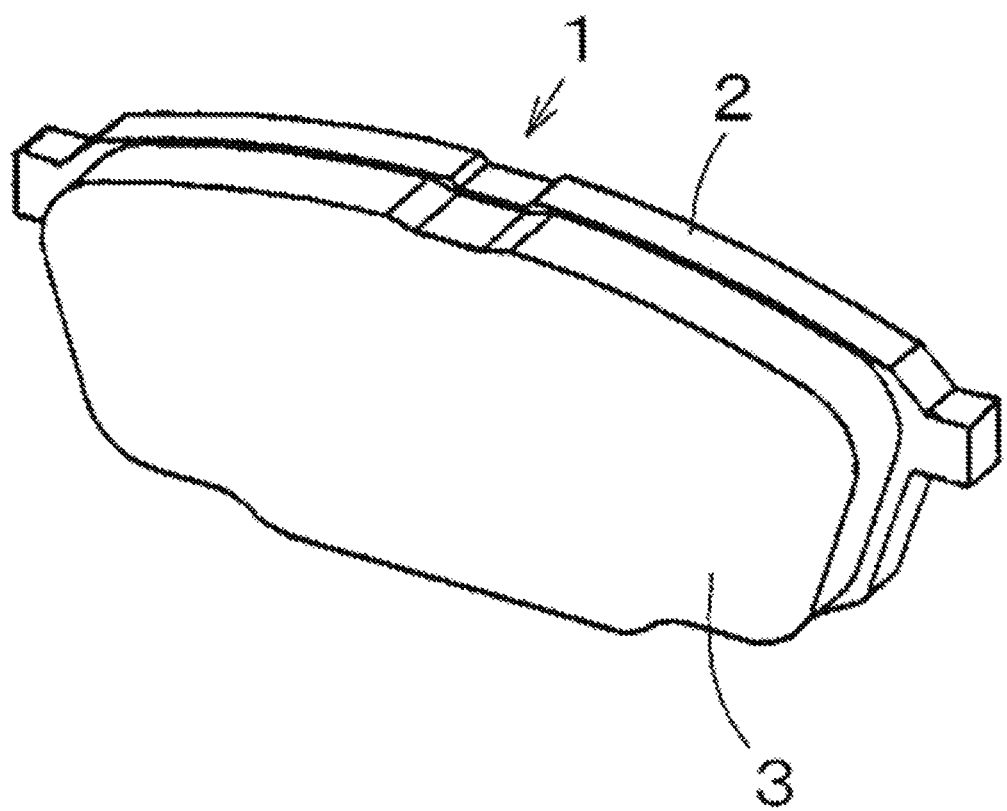

FRICTION MATERIAL

FIELD OF THE INVENTION

This invention relates to a friction material utilized for a disc brake pad of an automobile or the like, which is manufactured by forming Non-Asbestos-Organic (NAO) friction material composition.

BACKGROUND OF THE INVENTION

Conventionally, a disc brake is utilized as a brake device of a passenger car, and a disc brake pad made by fixing the friction material on a base member made of metal such as steel is utilized as a friction member of the disc brake.

The friction material is classified into a semi-metallic friction material containing, as a fiber base, 30 weight % or more but less than 60 weight % of a steel fiber relative to the total amount of the friction material composition, a low steel friction material containing a steel fiber in a part of the fiber base as well as less than 30 weight % of the steel fiber relative to the total amount of the friction material composition, and the NAO friction material containing no steel-based fiber such as the steel fiber and a stainless steel fiber.

The friction material generating less braking noise is demanded of late years, it is a recent trend to use the disc brake pad that uses the NAO friction material that does not contain the steel-based fiber but mainly contains such as a binder, a fiber base material, a lubricant, a titanate, an inorganic friction modifier, an organic friction modifier, pH adjuster, and a filler.

For the NAO friction material used for the brake pad, in order to secure the fade resistance and the wear resistance, 5-20 weight % of a copper component such as fibers and/or particles of copper and/or copper alloy relative to the total amount of the friction material composition, is added as a necessary component.

However, recently, the above-described friction material, when braking, discharges the copper as abrasion powder, and it is suggested that the discharged copper flows in a river, lake, and/or ocean and then the copper possibly contaminates an area around the discharged copper.

Because of these background, for example, California State (CA) and Washington State (WA) of the United States of America passed a bill to prohibit the sales of the friction member using the friction material containing 5 weight % or more of the copper component relative to the total friction material composition and an act of assembling the subject friction material in a new car from the year of 2021, and the sales of the friction member using the friction material containing 0.5 weight % or more or the copper component relative to the total amount of the friction material composition and an act of assembling the subject friction material in a new car from the year of 2025.

Then, as this type of regulations is expected to be spread out in the world from now on, the elimination of the copper component contained in the NAO friction material is urgently needed, and a primary issue is to improve the fade resistance and wear resistance that could be reduced due to the elimination of the copper component contained in the NAO friction material.

The Patent Document 1 discloses the friction material, which is manufactured by forming the friction material composition containing 0.5-50 weight % of the metallic tin or tin alloy relative to the total amount of the friction material composition and 0.001-4.999 weight % of the copper relative to the total amount of the friction material composition.

The Patent Document 2 discloses the nonasbestos friction material composition containing a binder, an organic filler, an inorganic filler, and a fiber base material where the amount of the copper contained in the friction material composition as the copper element is 5 mass % or less and the metallic fiber other than the copper and copper alloy contained therein is 0.5 mass % or less while the nonasbestos friction material composition contains the mica and the graphite with the particle diameter of 90 μm or less as the inorganic filler but does not contain graphite with the particle diameter of over 90 μm as the inorganic filler and the friction material, which is manufactured by forming the nonasbestos friction material composition.

However, the friction materials disclosed in the Patent Document 1 and Patent Document 2 are satisfying laws relating to the required amount of the copper component contained therein but cannot be said to sufficiently prove the demanded performance in the fade resistance and the wear resistance.

The Patent Document 3 discloses the friction material that contains the fiber base material, the resin binder, and the filler, in which as the filler, a natural scaly graphite is flaked and granulated to obtain a granulated flake graphite with the average particle diameter of 100-1000 μm and the bulk density of 0.10-0.20 g/cm$^3$.

The granulated flake graphite is formed by cleaving the natural scaly graphite to obtain a pre-mixed material, mixing the pre-mixed material with coal tar pitch or bulk mesophase pitch or graphitized binder such as phenolic resin and polyimide resin to obtain a pre-kneaded material, kneading the pre-kneaded material to obtain a pre-granulated material, granulating the pre-granulated material to obtain a pre-baked material, and then baking and carbonizing the pre-baked material. Also, the granulated flake graphite is formed by crushing the above baked and carbonized material. Here, the particle diameter of the granulated flake graphite is relatively large, and the bulk density is small so that the porosity of the friction material can be appropriately increased.

The granulated flake graphite is such that the entire particle is coated with the graphitized binder and the thermal conductivity and conductivity that the flake graphite naturally can be hindered, and therefore no other advantage than the increase of the porosity can be expected.

In addition, eliminating the copper component contained in the friction material clearly has various problems in the manufacturing process which became obvious.

The disc brake pad is manufactured through a mixing step of uniformly mixing the predetermined amount of the friction material composition by a mixer, a heat press forming step of heat press forming the obtained raw friction material mixture and a back plate, which is separately cleaned, surface treated, and adhesive applied, to be positioned in a heat forming die with the raw friction material mixture superposed thereon, a heat treatment step of heating the obtained molded article to complete the curing reaction of the binder, a coating step of coating the obtained article, a baking step of baking the coated article, and a grinding step of forming a friction surface by a grinder. Also, after the heat press forming step, it is possible to use a heat treatment step functioning both coating and baking steps and then the grinding step comes thereafter.

For the coating step, because of a better coat film, easier to collect the coating material, and less environmental impact because of the volatility organic solvent than the spray coating that uses liquid coating material such as organic coating solvent, an electrostatic powder coating that uses the powder coating as in the Patent Document 4 is generally employed.

Coating has been applied on an outer surface of the metallic back plate to prevent rusting; however, recently to increase the value of the disc brake pad, coating is applied on a peripheral side surface of the friction material except the friction surface as well as an outer surface of the back plate.

When the friction material includes the metallic material, the friction material has conductivity and therefore just like the metallic back plate, the friction material may be coated with the electrostatic powder coating. However, by eliminating the copper component, the conductivity of the friction material significantly decreases and the adhesiveness of the powder coating is weaken due to the static electricity, and therefore the coating on the friction material side surface becomes difficult.

PATENT DOCUMENTS

US Provisional Patent Publication No. 2010/0331447
Japanese Patent Publication No. 5057000
Japanese Provisional Patent Publication No. 1996-135701
Japanese Provisional Patent Publication No. 1994-320067

SUMMARY OF THE INVENTION

It is an object of this invention to provide the friction material utilized for the disc brake pad, which is manufactured by forming the NAO friction material composition, where the friction material secures the demanded performance of the fade resistance and the wear resistance, while satisfying laws relating to the required amount of the copper component contained therein, and further provides good application property of coating by the electrostatic powder coating.

The inventors, after investigation, found that the above-identified problems may be resolved by using the friction material composition that contains the predetermined amount of an exfoliated graphite particle which is obtained by pulverizing an expanded graphite particle and has an average particle diameter as the lubricant in which the total amount of the copper component contained therein is less than 5 weight % relative to the total amount of the friction material composition for the friction material utilized for the disc brake pad, which is manufactured by forming the NAO friction material composition, and completed this invention.

This invention relates to the friction material utilized for the disc brake pad, which is manufactured by forming the NAO friction material composition and has the following technology as the basis.

(1) The friction material utilized for the disc brake pad, in which the friction material is manufactured by forming the friction material composition, and is characterized in that the friction material composition contains 0.3-5 weight % of the exfoliated graphite particle with an average particle diameter of 1-100 μm relative to the total amount of the friction material composition as a lubricant and the total amount of the copper component contained in the friction material composition is less than 5 weight % relative to the total amount of the friction material composition.

(2) The above-described exfoliated graphite particle is aggregated and contained in the friction material composition as the particle aggregates.

(3) The above-described friction material composition is based on the friction material of (1) or (2) and further contains 2-10 weight % of mica with the average particle diameter of 100-400 μm relative to the total amount of the friction material composition.

Advantages of the Invention

According to this invention, the friction material utilized for the disc brake pad, which is manufactured by forming the NAO friction material composition, can secure the fade resistance and the wear resistance while satisfying laws relating to the required amount of the copper component and further provides the good application property of coating by the electrostatic powder coating

BRIEF DESCRIPTION OF THE DRAWINGS

FIG. 1 is a perspective view of an example of the disc brake pad using the friction material of this invention for the disc brake pad.

DETAILED DESCRIPTION OF THE INVENTION

In relation to the friction material utilized for the disc brake pad, which is manufactured by forming the friction material composition, the friction material composition contains 0.3-5.0 weight % of the exfoliated graphite particle with an average particle diameter of 1-100 μm as the lubricant relative to the total amount of the friction material composition and the total amount of the copper component contained in the friction material composition is less than 5 weight % relative to the total amount of the friction material composition.

The above-defined exfoliated graphite particle is a graphite particle having a graphene-like and high aspect ratio, which has higher thermal conductivity than the natural flake graphite, the kish graphite, and the pyrolytic graphite, that is conventionally used for the friction material, and the addition of the friction material composition as described above improves the heat radiation of the friction material.

Also, since the above-defined exfoliated graphite particle has high conductivity, the exfoliated graphite particle provides the conductivity to the friction material and does not decrease the property of coating due to the electrostatic powder coating when eliminating the copper component.

The above-defined exfoliated graphite particle is a graphite particle obtained by pulverizing the expanded graphite particle as the result of the heat-expanding the natural flake graphite, kish graphite, and/or pyrolytic graphite for several score times to several hundred times.

The expanded graphite is manufactured by adding the highly concentrated sulfuric acid, nitric acid, and oxidizing agent to the graphite particle such as the natural flake graphite, the kish graphite, and pyrolytic graphite, reacting the mixture at an appropriate temperature for an appropriate period of time to compound the sulfuric acid-graphite intercalation compound, and after washing, heating the same at 1000 centigrade to expand the graphite 100-300 times in the thickness direction.

The above-defined exfoliated graphite particle is manufactured through the method of pulverizing the expanded graphite particle obtained such as by the above-described process while the liquid being filled in the aperture of the expanded graphite particle or while the liquid being frozen, the method of spreading the expanded graphite particle within the liquid to apply ultra sound within the liquid, the method of spreading the expanded graphite particle and grinding the medium after forming the medium within the liquid, and the method of finely pulverizing the graphite slurry by a grinding mill after obtaining the graphite slurry as powdering the expanded graphite being immersed in the dispersive medium.

The above-defined exfoliated graphite particle, for example, can be commercially obtainable Surface Enhanced Flake Graphite series (ASBURYCARBONS, INC.)

Also, the exfoliated graphite particle is preferably contained in the friction material composition while being aggregated to form the particle aggregates without the binder.

By adding the exfoliated graphite particle to the friction material composition in the form of particle aggregates, the exfoliated graphite particle may be dispersed evenly in the friction material. The average particle diameter of the particle aggregates is preferably 30-500 μm.

The exfoliated graphite particle aggregates may be produced through conventional methods such as the particle sizing method using the particle sizing machine as compressing the above-defined exfoliated graphite particle with the roller compactor and the granulation method of using the conventional granulator such as the rotary drum granulator, the fluidized bed granulator, and the tumbling fluidized bed granulator.

The exfoliated graphite particle aggregates, for example, can be commercially obtainable C-THERM series (US trademark registration by TIMCALS. A.).

The exfoliated graphite particle has significantly high conductivity relative to the surface direction of the exfoliating form. In the friction material for the disc brake pad, the heat dissipation on the frictional surface of the friction material needs to be improved, and therefore the exfoliated graphite particle is tilted to preferably arrange the exfoliated graphite particle surface to be parallel to the friction surface.

Accordingly, to improve the orientation of the above-defined exfoliated graphite particle, 2-10 weight % of the mica with 100-400 μm of average particle diameter is added as the inorganic friction modifier relative to the total amount of the friction material composition.

The mica tends to orient parallel to the friction surface when the friction material composition is formed in the metallic forming die, and as described above, by adding the mica to the friction material composition, the material contained in the friction material composition is entirely oriented in the same direction.

Also, in this invention, the average particle diameter is to be the particle diameter of 50% measured by the laser diffraction particle sizing method.

By using the above-described friction material composition, in the friction material used for the disc brake pad, which is manufactured by forming the NAO friction material composition, while satisfying laws relating to the required amount of the copper component, the demanded performance of the fade resistance and the wear resistance are secured, and further the good application property of coating is provided by the electrostatic powder coating.

The friction material of this invention is made of the friction material composition including such as the above-described exfoliated graphite particle or exfoliated graphite particle aggregates, other than the mica, a binder, a fiber base material, a titanate, a lubricant, an inorganic friction modifier, an organic friction modifier, a pH adjuster, and a filler conventionally used in the friction material.

The binder may be one or any combination of two or more of the conventional binders such as a straight phenolic resin, a resin obtained by modifying a phenolic resin with cashew oil, silicone oil, or various elastomers such as acrylic rubber, an aralkyl modified phenolic resin obtained by reacting phenolic compounds, aralkyl ether compounds, and aldehyde compounds, a thermosetting resin dispersing such as various elastomers and fluorine polymer in the phenolic resin. The amount of the binder contained therein is preferably 4-12 weight % and more preferably 5-8 weight % relative to the total friction material composition.

The fiber base material may be one or any combination of two or more of the conventionally used organic fiber for the friction material such as an aramid fiber, a cellulose fiber, a poly-P-phenylene benzbisoxazole fiber, and an acrylic fiber or a conventionally used metallic fiber for the friction material such as a copper fiber, a bronze fiber, a brass fiber, an aluminum fiber, and a zinc fiber.

The amount of the organic fiber base contained therein is preferably 1-7 weight %, more preferably 2-4 weight % relative to the total amount of the friction material composition.

The amount of metallic fiber contained therein is preferably less than 7 weight %, more preferably less than 4 weight % relative to the total friction material component. When the metallic fiber containing a copper component is to be used, the total amount of the copper component is preferably less than 5 weight %, more preferably less than 0.5 weight % relative to the total amount of the friction material composition. Furthermore, from the point of view of reducing the burden on the environmental impact, no copper component is preferably included in the friction material composition.

The titanate is preferably in a sheet shape or plate-like and includes one or any combination of two or more of conventionally used titanate such as a potassium titanate, a lithium potassium titanate, and a magnesium potassium titanate. The amount of the titanate contained therein relative to the total amount of the friction material composition is preferably 7-35 weight %, more preferably 17-25 weight %.

As the lubricant, other than the above-described exfoliated graphite particle or the exfoliated graphite particle aggregates, the lubricant may be one or any combination of two or more of the conventionally used metallic sulfide type lubricant such as a molybdenum disulfide, a tungsten sulfide, a stannic sulfide, and a composite metal sulfide and the conventionally used carbon type lubricant such as a graphite other than the exfoliated graphite particle, a petroleum coke, an activated carbon, and a pulverized polyacrylonitrile oxidized fiber powder. The amount of the lubricant contained therein, in addition to the above exfoliated graphite particle, is preferably 2-13 weight %, more preferably 5-10 weight % relative to the total amount of the friction material composition.

For the inorganic friction modifier, other than the above-described mica, the inorganic friction modifier may be one or any combination of the two or more of the particle inorganic friction modifier such as a vermiculite, a magnetite, a calcium silicate hydrate, a glass beads, a magnesium oxide, a zirconium oxide, a zirconium silicate, an alumina, and a silicon carbide and the fiber inorganic friction modifier such as a wollastonite, a sepiolite, a basalt fiber, a glass fiber, a biodissolvable artificial mineral fiber, and a rock wool. The amount of the inorganic friction modifier contained therein, in addition to the above-described mica, is preferably 15-50 weight %, more preferably 20-45 weight % relative to the total amount of the friction material composition.

The organic friction modifier may be one or any combination of two or more of the organic friction modifiers conventionally used for the friction material such as a cashew dust, a powder of tire tread rubber, a vulcanized rubber powder or an unvulcanized rubber powder such as a nitrile rubber, an acrylic rubber, a silicone rubber, and an isobutylene-isoprene rubber. The amount of the organic friction modifier contained therein is preferably 3-8 weight %, more preferably 4-7 weight % relative to the total amount of the friction material composition.

The pH adjuster may be pH adjuster conventionally used for the friction material such as the calcium hydroxide. The amount of the pH adjuster is preferably 2-6 weight %, more preferably 2-3 weight % relative to the total amount of the friction material composition.

As the remainders of the friction material composition, the filler such as barium sulfate and the calcium carbonate may be used.

The friction material used in the disc brake of this invention is manufactured through the mixing step of uniformly mixing the predetermined amount of friction material composition oriented therein using a mixer, the heat press forming step of heat press forming the obtained raw friction material mixture positioned in the heat forming die superposed on the separately pre-cleaned, surface treated, and adhesive applied back plate, the heat treatment step of heating the obtained molded product to complete the cure reaction of the binder, the electrostatic powder coating step of coating the powder coating thereon, the baking step of baking the coating, and the grinding step of forming the friction surface by the rotary grinding wheel. Also, after the heat press forming step, the heat treatment step performing both the coating step and baking step may be replaced before the grinding step.

As necessary, prior to the heat press forming step, the granulation step of granulating the raw friction material mixture, the kneading step of kneading the raw friction material, and the pre-forming step of forming an unfinished preformed article by positioning the raw friction material mixture or the granulation obtained through the granulation step and the kneaded article obtained through the kneading step into the pre-forming die, are performed, and after the heat press forming step, the scorching step is performed.

Embodiments

In the following sections, the embodiments and the comparative examples are shown; however, this invention is not limited to the embodiments described below.

[Manufacturing Method for Friction Material in Embodiments 1-11 and Comparative Examples 1-6]

The friction material composition shown in TABLE 1 and TABLE 2 is mixed for 5 minutes by the Loedige mixer and is pressed in the forming die under 30 MPa for 10 seconds to perform the preforming. This preforming product is superposed on the pre-cleaned, surface treated, adhesive coated steel back plate to form for 10 minutes in the heat forming die at the forming temperature of 150 centigrade under the forming pressure of 40 MPa, to heat treatment (post-curing) for 5 hours at 200 centigrade, to coat the epoxy resin powder coating by the electrostatic powder coating device, to heat to bake the coating for 4 minutes at 220 centigrade by the mid infrared ray heater, and to grind to form the friction surface for the disc brake pad of the automotive (Embodiments 1-11 and Comparative Examples 1-6).

The fade resistance, the wear resistance, and the property of coating of the obtained friction material is evaluated. The results of the evaluation are shown in the TABLE 3 and TABLE 4 and the evaluation standard is shown in the TABLE 5.

TABLE 1

| | | E1 | E2 | E3 | E4 | E5 | E6 | E7 | E8 | E9 | E10 | E11 |
|---|---|---|---|---|---|---|---|---|---|---|---|---|
| Binder | Straight Phenollic Resin | 6.0 | 6.0 | 6.0 | 6.0 | 6.0 | 6.0 | 6.0 | 6.0 | 6.0 | 6.0 | 6.0 |
| Organic Fiber | Aramid fiber | 3.0 | 3.0 | 3.0 | 3.0 | 3.0 | 3.0 | 3.0 | 3.0 | 3.0 | 3.0 | 3.0 |
| Metallic Fiber | Copper Fiber | 0.0 | 0.0 | 0.0 | 0.0 | 0.0 | 0.0 | 0.0 | 0.0 | 0.0 | 0.0 | 4.0 |
| Titanate | Sheet shape Potassium Titanate | 19.0 | 19.0 | 19.0 | 19.0 | 19.0 | 19.0 | 19.0 | 19.0 | 19.0 | 19.0 | 19.0 |
| Lubricant | Molybdenum Disulfide | 2.0 | 2.0 | 2.0 | 2.0 | 2.0 | 2.0 | 2.0 | 2.0 | 2.0 | 2.0 | 2.0 |
| | Flake Graphite (Average Particle Diameter: 0.5 μm) | | | | | | | | | | | |
| | Flake Graphite (Average Particle Diameter: 1 μm) | | | | | | | | | | 5.0 | |
| | Flake Graphite (Average Particle Diameter: 70 μm) | | 3.0 | 3.0 | 3.0 | 3.0 | 3.0 | 3.0 | 3.0 | | | |

TABLE 1-continued

| | | E1 | E2 | E3 | E4 | E5 | E6 | E7 | E8 | E9 | E10 | E11 |
|---|---|---|---|---|---|---|---|---|---|---|---|---|
| | Flake Graphite (Average Particle Diameter: 100 μm) | 0.3 | | | | | | | | | | |
| | Flake Graphite (Average Particle Diameter: 200 μm) | | | | | | | | | | | |
| | Flake Graphite Particle Aggregates | | | | | | | | | | 3.0 | 3.0 |
| | Natural Squamous Graphite (Average Particle Diameter 100 μm) | | | | | | | | | | | |
| | Cokes | 2.0 | 2.0 | 2.0 | 2.0 | 2.0 | 2.0 | 2.0 | 2.0 | 2.0 | 2.0 | 2.0 |
| Inorganic Friction Modifier | Alumina | 1.0 | 1.0 | 1.0 | 1.0 | 1.0 | 1.0 | 1.0 | 1.0 | 1.0 | 1.0 | 1.0 |
| | Zirconium Silicate | 5.0 | 5.0 | 5.0 | 5.0 | 5.0 | 5.0 | 5.0 | 5.0 | 5.0 | 5.0 | 5.0 |
| | Zirconium Oxide | 25.0 | 25.0 | 25.0 | 25.0 | 25.0 | 25.0 | 25.0 | 25.0 | 25.0 | 25.0 | 25.0 |
| | Magnetite | 3.0 | 3.0 | 3.0 | 3.0 | 3.0 | 3.0 | 3.0 | 3.0 | 3.0 | 3.0 | 3.0 |
| | Mica (Average Particle Diameter: 50 μm) | | | | | 10.0 | | | | | | |
| | Mica (Average Particle Diameter: 100 μm) | 6.0 | | | | | 10.0 | 13.0 | 6.0 | 6.0 | 6.0 | 6.0 |
| | Mica (Average Particle Diameter: 400 μm) | | 1.0 | 2.0 | | | | | | | | |
| | Mica (Average Particle Diameter: 500 μm) | | | | 2.0 | | | | | | | |
| Organic Friction Modifier | Cashew Dust | 4.0 | 4.0 | 4.0 | 4.0 | 4.0 | 4.0 | 4.0 | 4.0 | 4.0 | 4.0 | 4.0 |
| | Powder of Tire Tread Rubber | 2.0 | 2.0 | 2.0 | 2.0 | 2.0 | 2.0 | 2.0 | 2.0 | 2.0 | 2.0 | 2.0 |
| pH adjuster | Calcium Hydroxide | 2.0 | 2.0 | 2.0 | 2.0 | 2.0 | 2.0 | 2.0 | 2.0 | 2.0 | 2.0 | 2.0 |
| Filler | Barium Sulfate | 19.7 | 22.0 | 21.0 | 21.0 | 13.0 | 13.0 | 10.0 | 17.0 | 15.0 | 17.0 | 13.0 |
| | Total (Weight %) | 100.0 | 100.0 | 100.0 | 100.0 | 100.0 | 100.0 | 100.0 | 100.0 | 100.0 | 100.0 | 100.0 |

E = Embodiment

TABLE 2

| | | CE 1 | CE 2 | CE 3 | CE 4 | CE 5 | CE 6 |
|---|---|---|---|---|---|---|---|
| Binder | Straight Phenollic Resin | 6.0 | 6.0 | 6.0 | 6.0 | 6.0 | 6.0 |
| Organic Fiber | Aramid fiber | 3.0 | 3.0 | 3.0 | 3.0 | 3.0 | 3.0 |
| Metallic Fiber | Copper Fiber | 0.0 | 0.0 | 0.0 | 0.0 | 10.0 | 0.0 |
| Titanate | Sheet shape Potassium Titanate | 19.0 | 19.0 | 19.0 | 19.0 | 19.0 | 19.0 |
| Lubricant | Molybdenum Disulfide | 2.0 | 2.0 | 2.0 | 2.0 | 2.0 | 2.0 |
| | Flake Graphite (Average Particle Diameter: 0.5 μm) | | | | 5.0 | | |

TABLE 2-continued

|  |  | CE 1 | CE 2 | CE 3 | CE 4 | CE 5 | CE 6 |
|---|---|---|---|---|---|---|---|
|  | Flake Graphite (Average Particle Diameter: 1 μm) |  |  | 6.0 |  |  |  |
|  | Flake Graphite (Average Particle Diameter: 70 μm) |  |  |  |  |  |  |
|  | Flake Graphite (Average Particle Diameter: 100 μm) | 0.1 |  |  |  |  |  |
|  | Flake Graphite (Average Particle Diameter: 200 μm) |  | 0.3 |  |  |  |  |
|  | Flake Graphite Particle Aggregates |  |  |  |  |  |  |
|  | Natural Squamous Graphite (Average Particle Diameter 100 μm) |  |  |  |  | 3.0 | 3.0 |
|  | Cokes | 2.0 | 2.0 | 2.0 | 2.0 | 2.0 | 2.0 |
| Inorganic Friction Modifier | Alumina | 1.0 | 1.0 | 1.0 | 1.0 | 1.0 | 1.0 |
|  | Zirconium Silicate | 5.0 | 5.0 | 5.0 | 5.0 | 5.0 | 5.0 |
|  | Zirconium Oxide | 25.0 | 25.0 | 25.0 | 25.0 | 25.0 | 25.0 |
|  | Magnetite | 3.0 | 3.0 | 3.0 | 3.0 | 3.0 | 3.0 |
|  | Mica (Average Particle Diameter: 50 μm) |  |  |  |  |  |  |
|  | Mica (Average Particle Diameter: 100 μm) | 6.0 | 6.0 | 6.0 | 6.0 | 6.0 | 6.0 |
|  | Mica (Average Particle Diameter: 400 μm) |  |  |  |  |  |  |
|  | Mica (Average Particle Diameter: 500 μm) |  |  |  |  |  |  |
| Organic Fliction Modifier | Cashew Dust | 4.0 | 4.0 | 4.0 | 4.0 | 4.0 | 4.0 |
|  | Powder of Tire Tread Rubber | 2.0 | 2.0 | 2.0 | 2.0 | 2.0 | 2.0 |
| pH adjuster | Calcium Hydroxide | 2.0 | 2.0 | 2.0 | 2.0 | 2.0 | 2.0 |
| Filler | Barium Sulfate | 19.9 | 19.7 | 14.0 | 15.0 | 7.0 | 17.0 |
|  | Total (Weight %) | 100.0 | 100.0 | 100.0 | 100.0 | 100.0 | 100.0 |

CE = Comparative Example

TABLE 3

|  | E1 | E2 | E3 | E4 | E5 | E6 | E7 | E8 | E9 | E10 | E11 |
|---|---|---|---|---|---|---|---|---|---|---|---|
| Stability of Friction Coefficient | ○ | ○ | ○ | ○ | ○ | ○ | ○ | ○ | Δ | ○ | ◎ |
| Fade Resistance | Δ | Δ | ○ | Δ | Δ | ○ | Δ | ○ | Δ | ◎ | ◎ |
| Wear Resistance | Δ | ○ | ○ | ○ | ○ | ○ | ○ | ○ | ○ | ◎ | ◎ |
| Property of Coating | Δ | ○ | ○ | Δ | ○ | ○ | Δ | ○ | Δ | ◎ | ◎ |

E = Example

TABLE 4

|  | CE1 | CE2 | CE3 | CE4 | CE5 | CE6 |
|---|---|---|---|---|---|---|
| Stability of Friction Coefficient | ◎ | X | X | Δ | ◎ | Δ |
| Fade Resistance | X | ○ | Δ | X | ◎ | X |
| Wear Resistance | Δ | ○ | ○ | ○ | ◎ | Δ |
| Property of Coating | X | ○ | ○ | Δ | ◎ | X |

CE = Comparative Example

TABLE 5

| Item of Evaluation |  | Stability of Friction Coefficient | Fade Resistance | Wear Resistance | Property of Coating |
|---|---|---|---|---|---|
| Evaluation Method | Test Condition | JASO C406 Passenger Car - Braking Device - Dynamometer Test Procedures | | JASO C427 Brake Lining and Disc Brake Pad - Wear Test Procedure on Interia Dynamometer | Visual Check on the Coating Condition of the Friction Side Surface |
|  | Evaluation Content | 2nd Average Effectiveness μ | 1st Fade Minimum μ | 200 Centigrade Wear Amount |  |
| Determination Standard | ◎ | 0.40 or more | 0.25 or more | less than 0.10 mm | Entirely Uniformly Coated |
|  | ○ | 0.37 or more, less than 0.40 | 0.22 or more, less than 0.25 | 0.10 mm or more, less than 0.15 mm | Entirely Coated but Surface Irregularity Exists |
|  | Δ | 0.34 or more, less than 0.37 | 0.19 or more, less than 0.22 | 0.15 mm or more, less than 0.20 mm | Uncoated Portion Exists |
|  | X | less than 0.34 | less than 0.19 | 0.20 mm or more | No Coating |

According to this invention, in the friction material which is manufactured by forming the NAO friction material composition, the friction material secures the demanded performance of the fade resistance and the wear resistance, while satisfying laws of the required amount of the copper component contained therein and further provides good application property of coating by the electrostatic powder coating, which provides an extreme practical valuable.

| Brief Explanation of the References |
| --- |
| 1. Disc Brake Pad |
| 2. Back Plate |
| 3. Friction Material |

The invention claimed is:

1. A friction material utilized for a disc brake pad, which is manufactured by forming a friction material composition, wherein
said friction material composition contains 4-12 weight % of a binder relative to the total amount of the friction material composition, 3-8 weight % of an organic friction modifier relative to the total amount of the friction material composition, 7-35 weight % of a sheet shape titanate relative to the total amount of the friction material composition, and 0.3-5 weight % of an exfoliated graphite particle with an average particle diameter of 1-100 μm, relative to a total amount of the friction material composition as a lubricant and a total amount of a copper component contained in the friction material composition is less than 5 weight % relative to the total amount of friction material composition.

2. The friction material according to claim 1, wherein said exfoliated graphite particle is included in the friction material composition in a form of particle aggregates with an average particle diameter of 30-500 μm.

3. The friction material according to claim 1, wherein
the friction material composition further contains 2-10 weight % of mica with an average particle diameter of 100-400 μm relative to a total amount of the friction material composition.

4. The friction material according to claim 2, wherein
the friction material composition further contains 2-10 weight % of mica with an average particle diameter of 100-400 μm relative to a total amount of the friction material composition.

* * * * *